Figure 1:
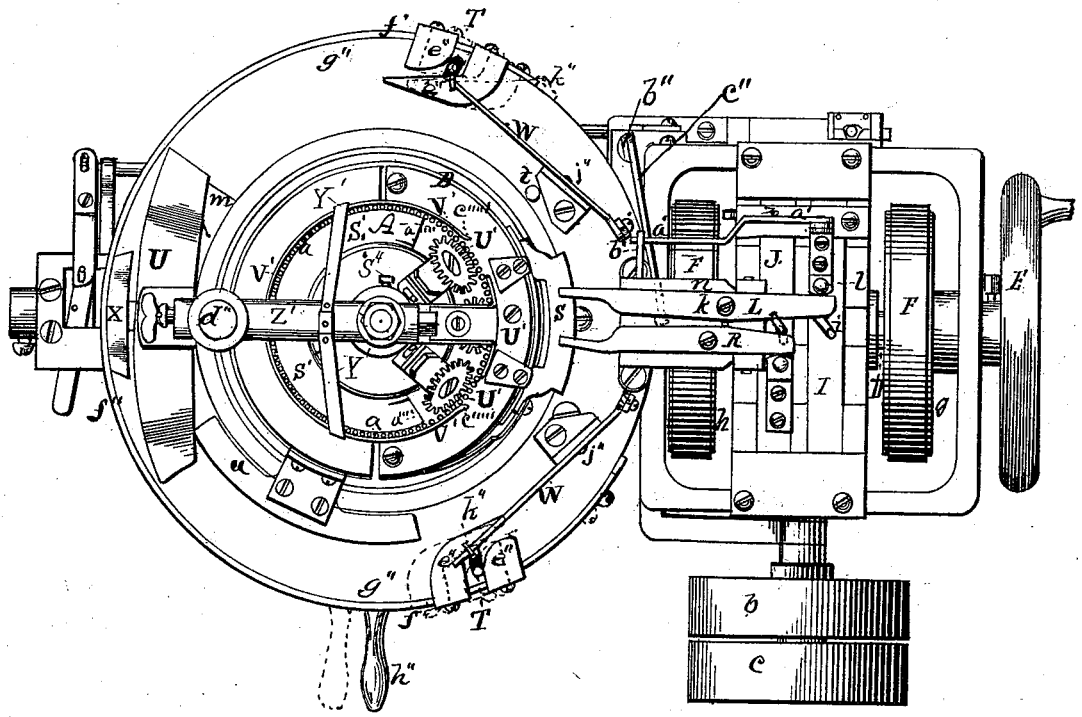

(No Model.) 11 Sheets—Sheet 1.

W. H. PEPPER & A. T. L. DAVIS.
CIRCULAR KNITTING MACHINE.

No. 350,466. Patented Oct. 5, 1886.

WITNESSES:

INVENTORS,
Wm H. Pepper,
Albert T. L. Davis,
By their atty, J. S. Brown.

(No Model.) 11 Sheets—Sheet 3.

W. H. PEPPER & A. T. L. DAVIS.
CIRCULAR KNITTING MACHINE.

No. 350,466. Patented Oct. 5, 1886.

WITNESSES: INVENTORS (No Model.) 11 Sheets—Sheet 4.

W. H. PEPPER & A. T. L. DAVIS.
CIRCULAR KNITTING MACHINE.

No. 350,466. Patented Oct. 5, 1886.

Fig. 6½.

WITNESSES:
Norris A. Clark
Arthur S. Brown

INVENTORS,
Wm. H. Pepper,
Albert T. L. Davis,
By their atty, J. S. Brown.

N. PETERS, Photo-Lithographer, Washington, D. C.

(No Model.) 11 Sheets—Sheet 5.
W. H. PEPPER & A. T. L. DAVIS.
CIRCULAR KNITTING MACHINE.
No. 350,466. Patented Oct. 5, 1886.
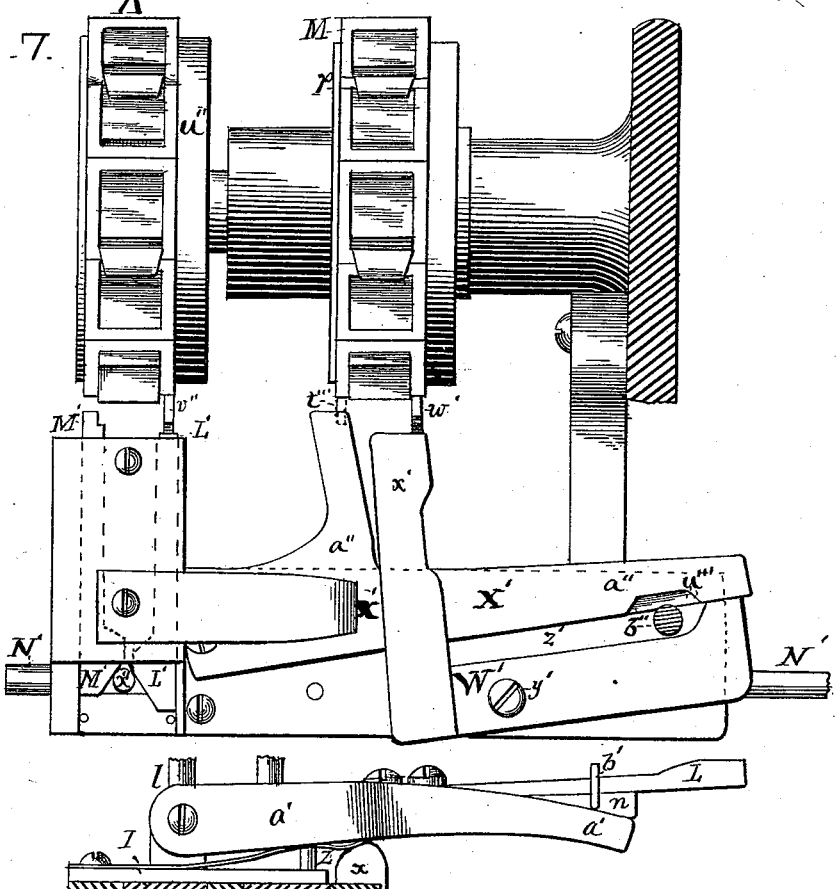
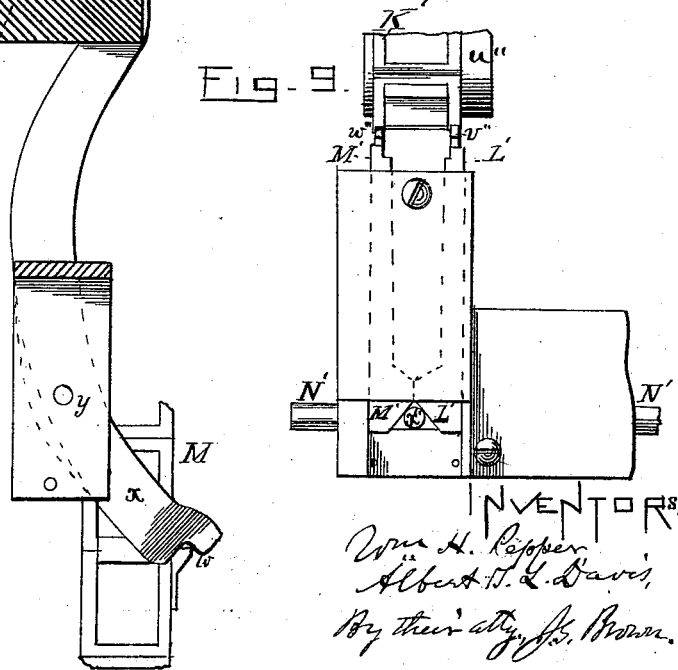
WITNESSES:
Norris A. Clark
Arthur S. Brown
INVENTORS,
Wm. H. Pepper
Albert T. L. Davis,
By their atty. J. S. Brown.

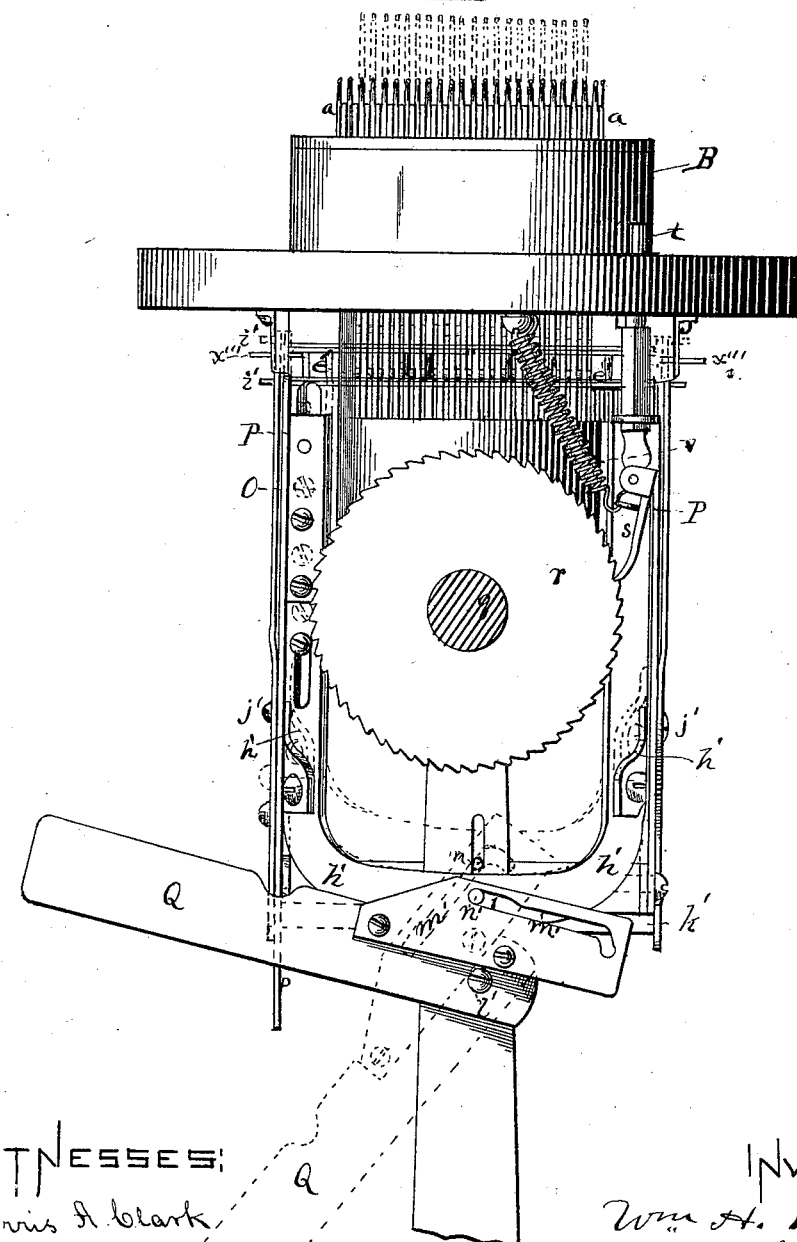

(No Model.) 11 Sheets—Sheet 7.

W. H. PEPPER & A. T. L. DAVIS.
CIRCULAR KNITTING MACHINE.

No. 350,466. Patented Oct. 5, 1886.

WITNESSES:
Norris A. Clark
Arthur S. Brown

INVENTORS,
Wm. H. Pepper,
Albert T. L. Davis,
By their atty. A. S. Brown.

(No Model.)  11 Sheets—Sheet 8.
W. H. PEPPER & A. T. L. DAVIS.
CIRCULAR KNITTING MACHINE.
No. 350,466.  Patented Oct. 5, 1886.
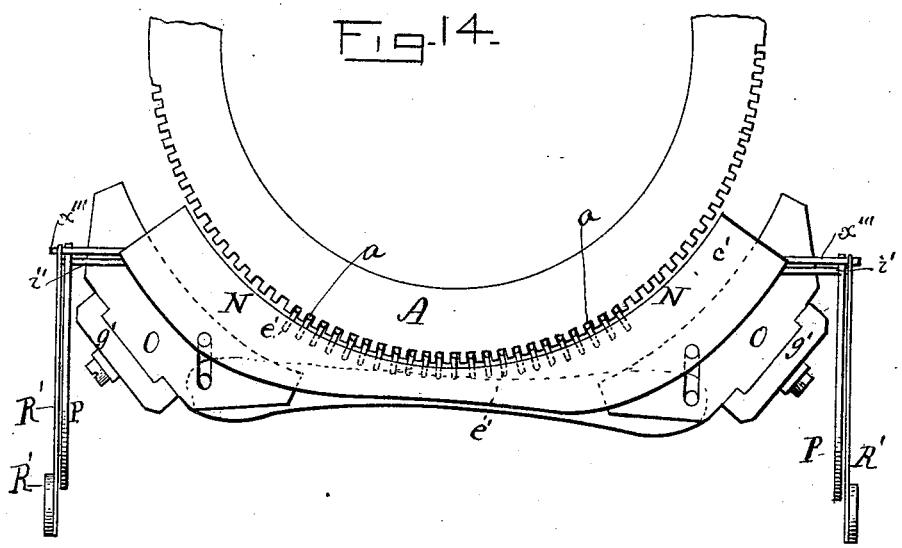
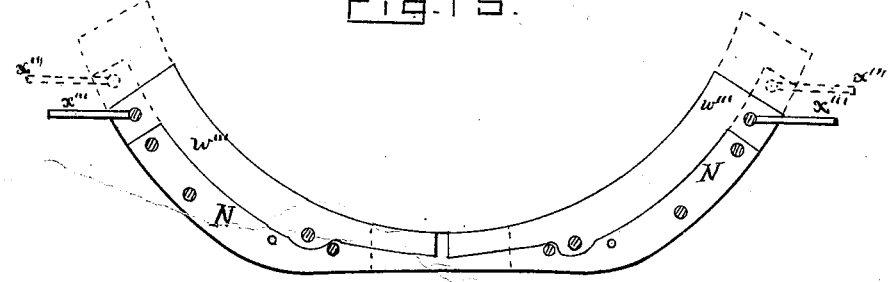
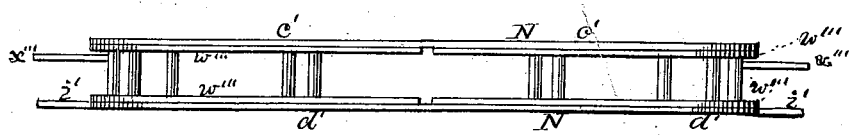
WITNESSES:
Norris A. Clark.
Arthur S. Brown.
INVENTORS,
Wm. H. Pepper,
Albert T. L. Davis,
By their atty. J. S. Brown.

(No Model.) 11 Sheets—Sheet 9.
W. H. PEPPER & A. T. L. DAVIS.
CIRCULAR KNITTING MACHINE.
No. 350,466. Patented Oct. 5, 1886.
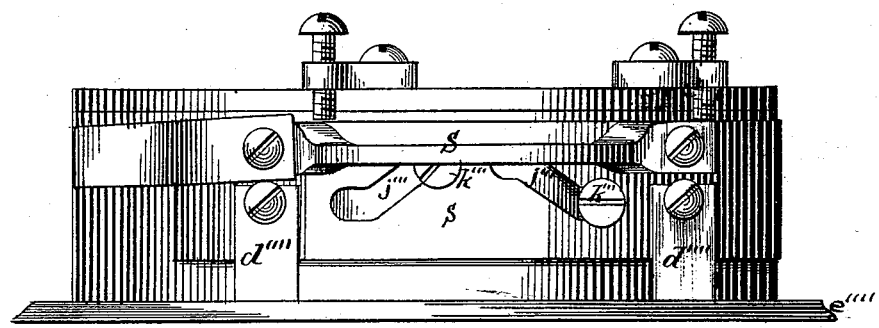
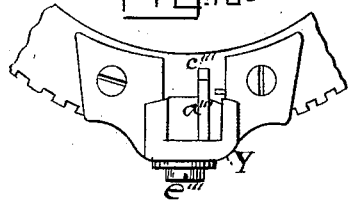
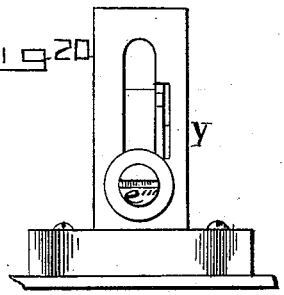
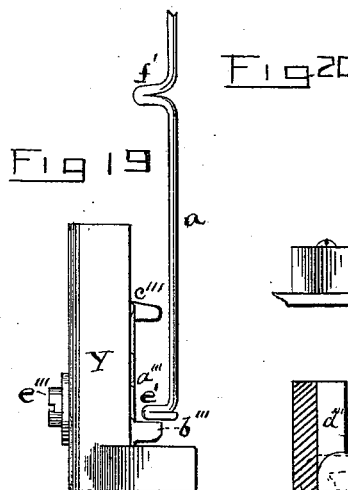
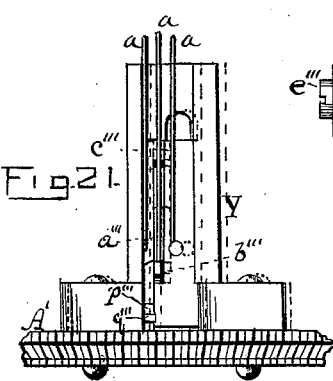
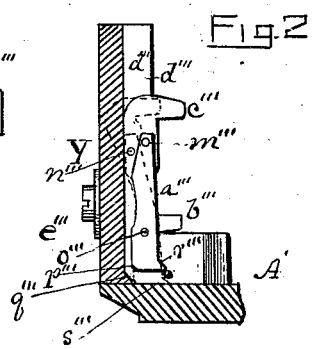
WITNESSES:
Norris A. Clark
Arthur S. Brown
INVENTORS
Wm. H. Pepper,
Albert T. L. Davis,
By J. S. Brown, their atty.
N. PETERS. Photo-Lithographer, Washington, D. C.

(No Model.) 11 Sheets—Sheet 10.
W. H. PEPPER & A. T. L. DAVIS.
CIRCULAR KNITTING MACHINE.
No. 350,466. Patented Oct. 5, 1886.
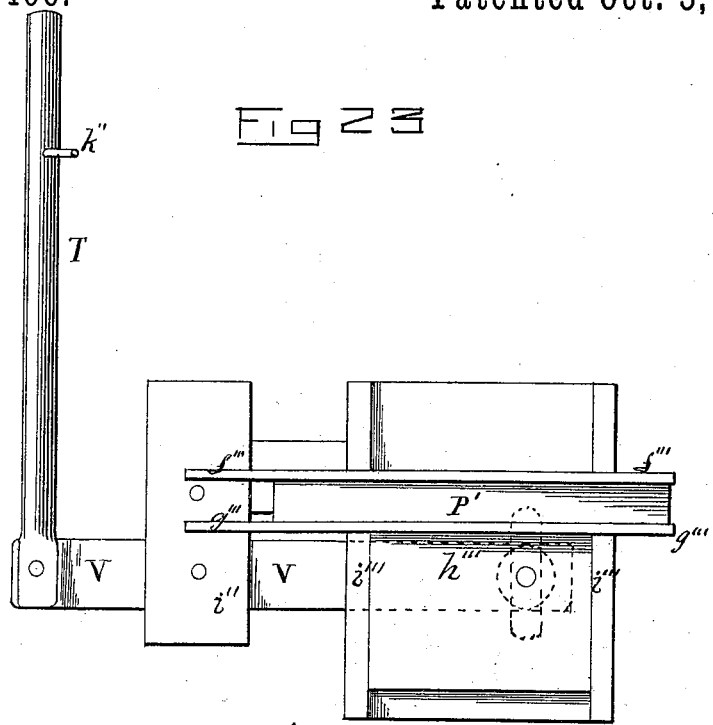
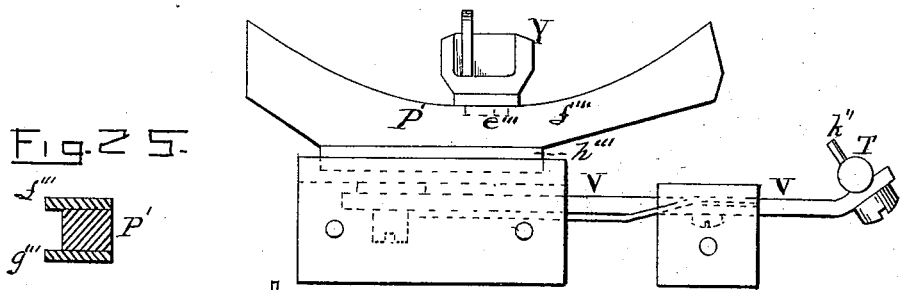
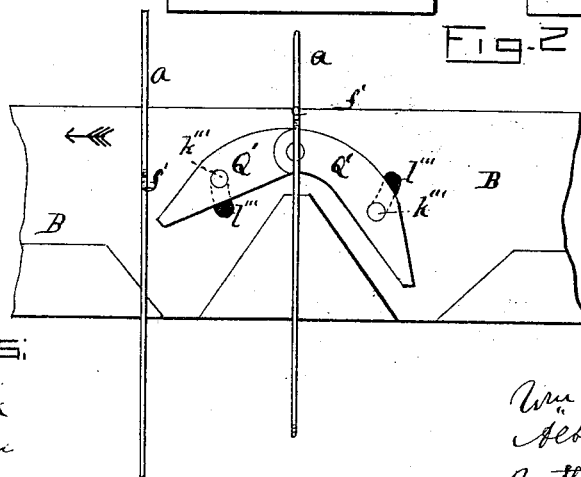
WITNESSES:
Norris A. Clark
Arthur S. Brown
INVENTORS:
Wm. H. Pepper,
Albert T. L. Davis,
By their atty J. S. Brown.

(No Model.) 11 Sheets—Sheet 11.
W. H. PEPPER & A. T. L. DAVIS.
CIRCULAR KNITTING MACHINE.
No. 350,466. Patented Oct. 5, 1886.
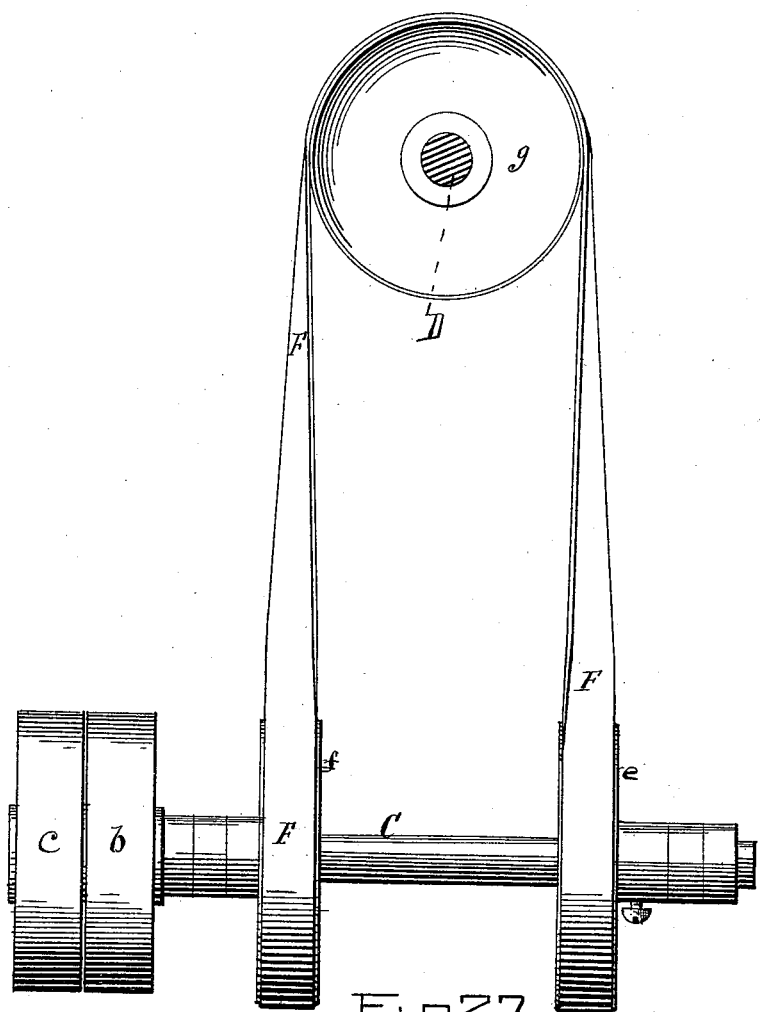
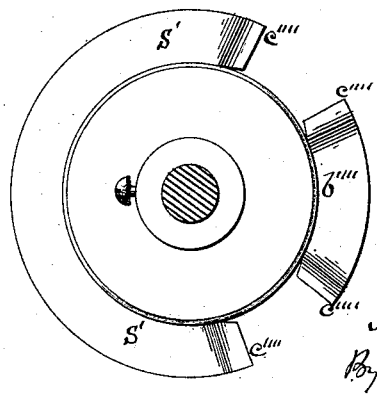

UNITED STATES PATENT OFFICE.

WILLIAM H. PEPPER AND ALBERT T. L. DAVIS, OF LAKE VILLAGE, NEW HAMPSHIRE, ASSIGNORS TO JOSEPH A. BURLEIGH, OF SAME PLACE.

CIRCULAR-KNITTING MACHINE.

SPECIFICATION forming part of Letters Patent No. 350,466, dated October 5, 1886.

Application filed June 19, 1885. Serial No. 169,214. (No model.)

*To all whom it may concern:*

Be it known that we, WILLIAM H. PEPPER and ALBERT T. L. DAVIS, of Lake Village, in the county of Belknap and State of New Hampshire, have invented certain Improvements in Circular-Knitting Machines; and we do hereby declare that the following is a full and exact description thereof, reference being had to the accompanying drawings, making part of this specification.

Our invention relates to circular-knitting machines adapted to knitting stockings and half-hose, the leg and foot being knit in a circular web, and the heel and toe being formed in a continuous web with the leg and foot by narrowing and widening to the extent of the requisite number of stitches, and the edges of the narrowed and widened web being automatically joined in the act of widening.

In knitting stockings and hose by this method the ordinary way of performing the operations is to knit a circular web until the leg is formed; then to throw out of action a certain number of the needles where the web is made continuous on the front part of the ankle; then to form the heel by narrowing the remaining part of the web, turning the machine by hand part way round, and then back in the other direction as far as necessary, moving more needles out of action by hand between these forward and backward movements of the machine one by one, and first on one side and then on the other, to effect the narrowing until the web is sufficiently narrowed; then, while still turning the machine—that is, the needle-operating mechanism—partially around, first one way and then the other, again by hand moving the inoperative needles one by one into action for widening the web until a widened web is joined to the entire narrowed web; then to knit a circular web till the foot part is completed; and, finally, to make the toe by narrowing and widening in the same manner as the heel is formed.

Our improvements consist in improved mechanisms, whereby, first, the machine is stopped automatically; second, whereby the needles which are to be continually out of action while knitting the heel and toe are simultaneously raised out of the reach of the needle-actuating cams preparatory to the narrowing and widening operations; third, whereby the movement of the machine is automatically changed from a continuously-revolving to a partially-revolving reciprocating movement preparatory to knitting the heel or toe of the stocking; fourth, whereby the narrowing-needles are automatically raised out of action, one by one; fifth, whereby the movement is automatically changed from a narrowing to a widening operation; sixth, whereby the needles which were raised out of action in narrowing are again automatically brought into action one by one for widening; seventh, whereby the machine is automatically stopped at the completion of the widening operation; eighth, whereby its movement is changed from a partially-revolving reciprocating movement to a continuously-revolving movement preparatory to knitting a circular web for the foot or leg; ninth, whereby the needles which were continually out of action while knitting the heel or toe are again brought into action for knitting the circular web again; tenth, whereby the various mechanisms above set forth are brought into proper relation to one another and without interfering one with another.

Our invention further consists in means or mechanism whereby we automatically change the number of narrowing and widening needles from a larger number for forming the heel to a smaller number for forming the toe, and again automatically change back from the smaller number for forming the toe to the larger number for forming the heel.

Our invention further consists in a means or device whereby the knit web is held down in proper position on the needles, whereby a weight or other means of drawing upon the the web itself for the purpose which does not act evenly upon all parts of the variously-shaped web knit by this method is dispensed with, and also whereby stitches are properly held and formed on the operating-needles next to the terminal narrowing and widening needles.

Figure 2:
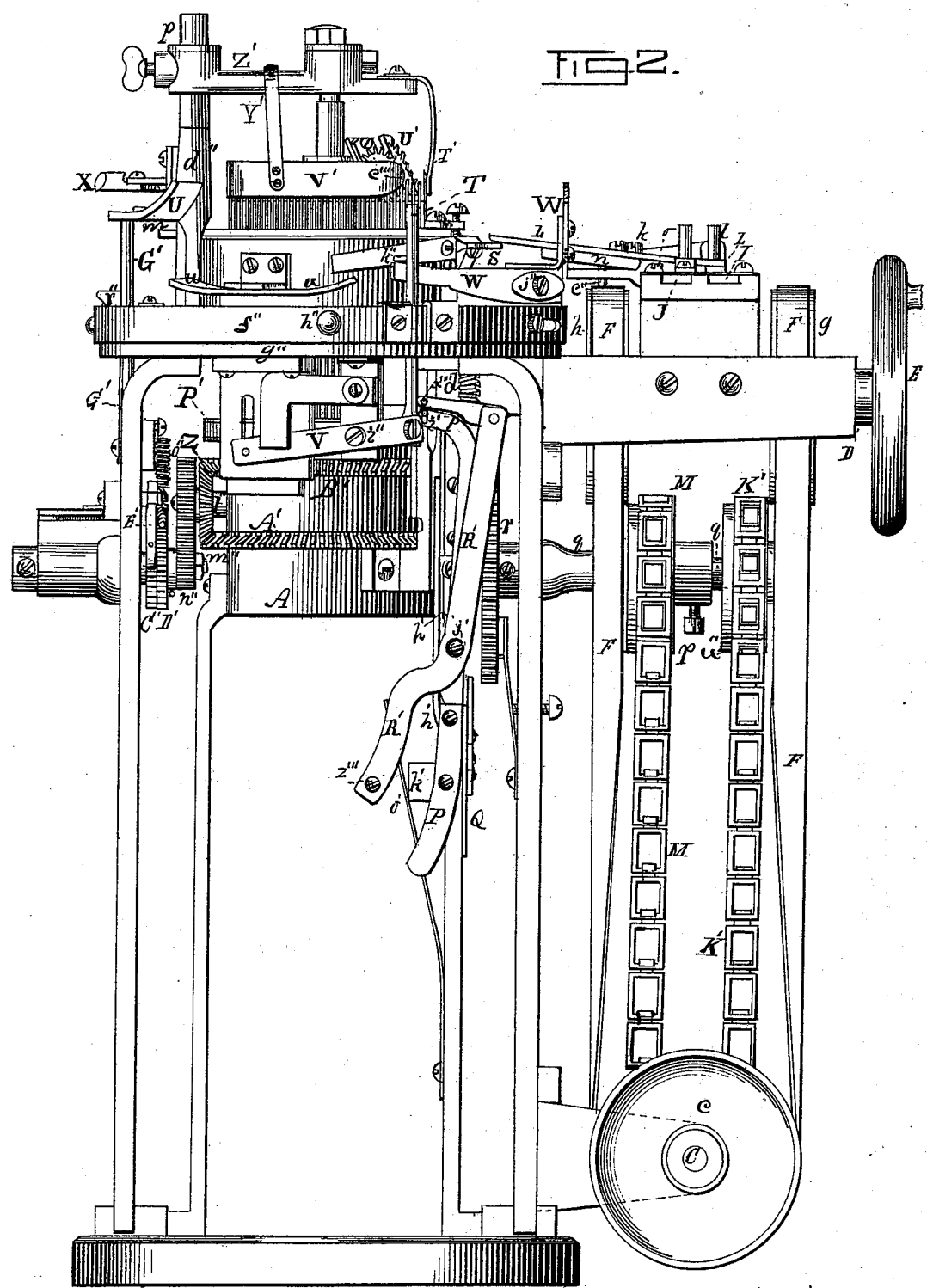
Figure 3:
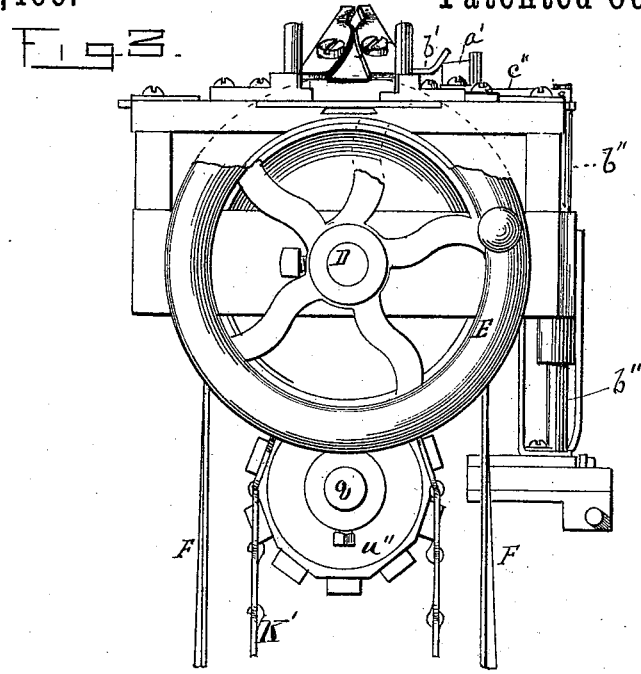
Figure 4:
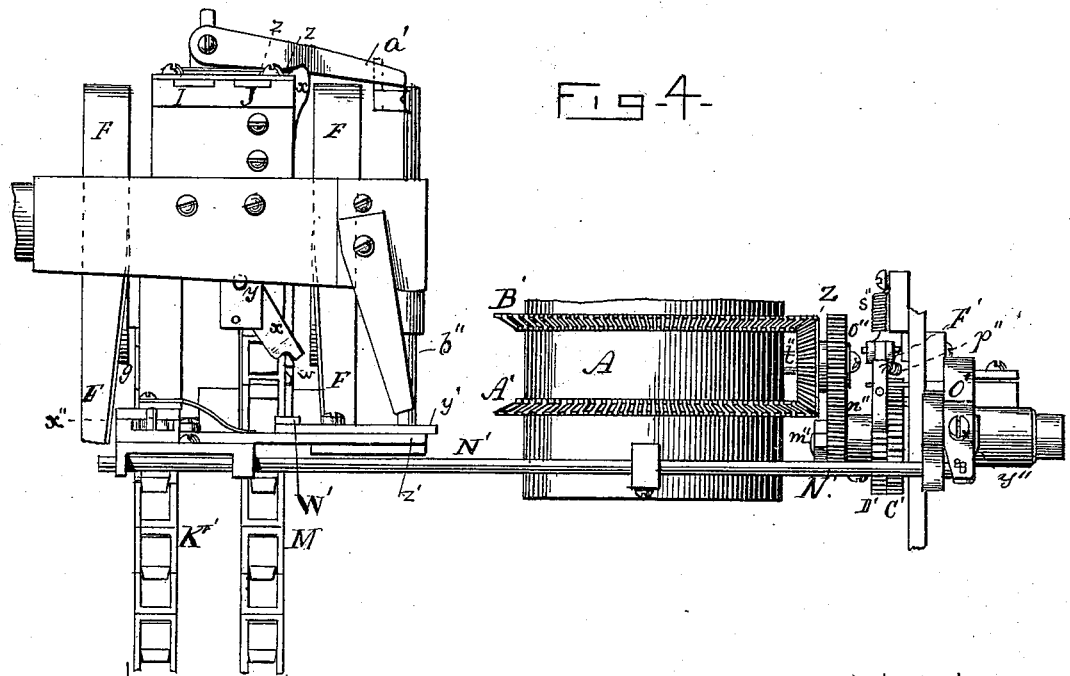
Figure 5:
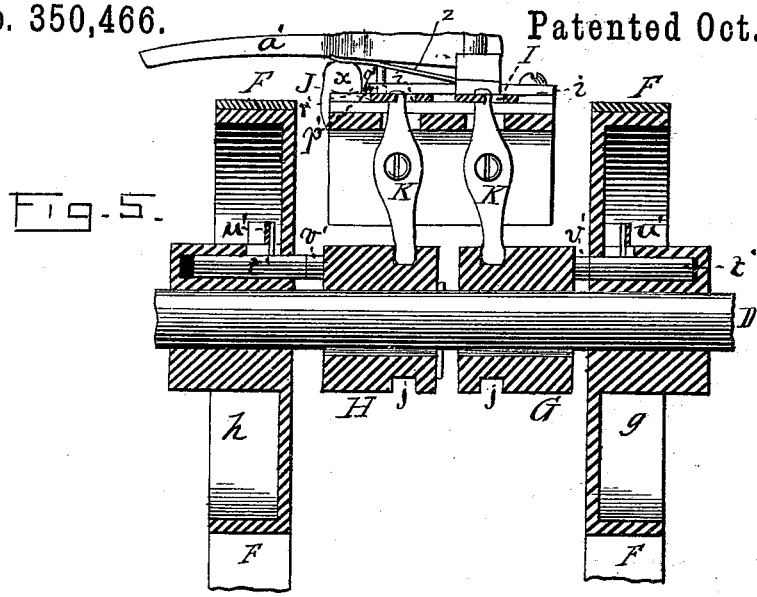
Figure 6:
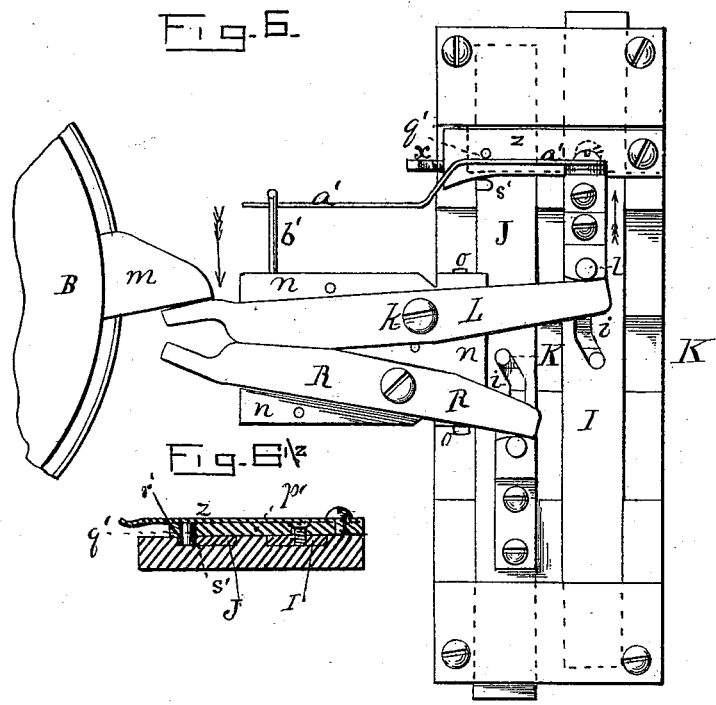
Figure 11:
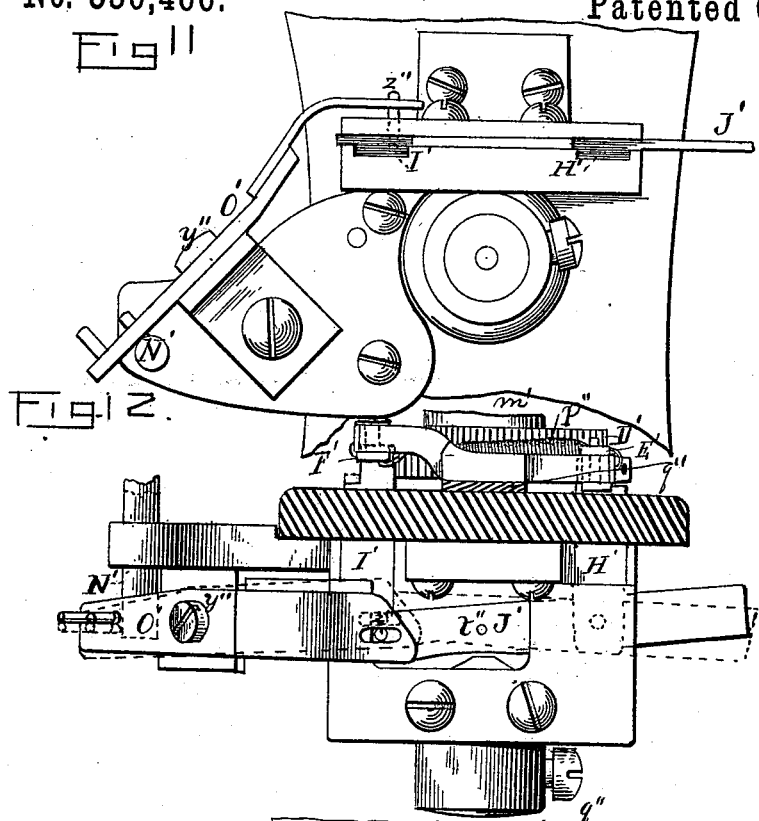
Figure 12:
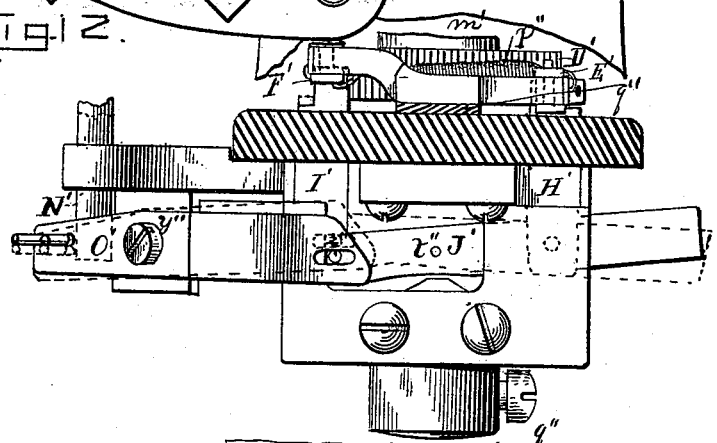
Figure 13:
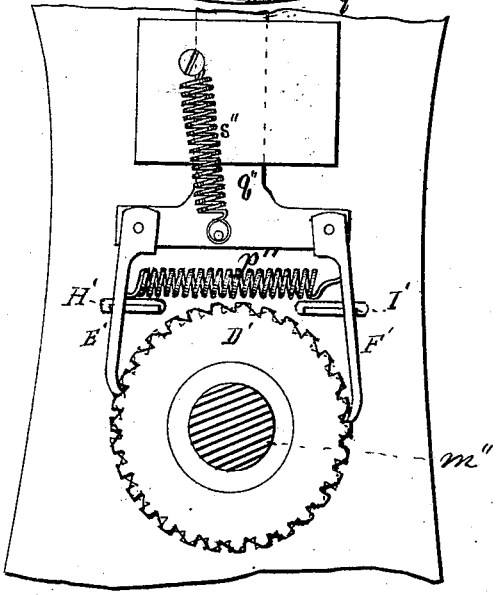

In the drawings, Figure 1 represents a top view of a circular-knitting machine provided with our improvements; Fig. 2, a front view of the same; Fig. 3, a side view of a portion of the machine, at the right-hand side, at right angles to the front view; Fig. 4, a rear view of a part of the machine; Fig. 5, a vertical section of a portion of the machine in the axial line of the driving-shaft; Fig. 6, a top view of a part of the machine, showing some of the working parts in different positions from those shown in Fig. 1; Fig. 6½, cross-section of parts shown in Fig. 6; Fig. 7, a top view of the pattern-chains mounted on their sprocket-wheels and shaft, showing, also, some of the parts moved by the pattern-chains; Fig. 8, a vertical section of a portion of the machine, looking forward toward one of the pattern-chains which actuates the operative parts shown; Fig. 9, a top view of a small portion of the machine, showing a part of one of the pattern-chains and parts actuated thereby in positions different from those shown of the same parts in Fig. 7; Fig. 10, a sectional side view of a portion of the machine, taken in the plane inside of the pattern-wheels and driving-shaft, and looking toward the needle-cylinder; Fig. 11, a partial side view of the machine, looking from the left hand, and showing a portion of the mechanism for controlling the movements of the narrowing and widening mechanism; Fig. 12, a top view of the same controlling mechanism, the portion of the frame on which it is mounted being in horizontal section; Fig. 13, a side view of a portion of the same mechanism, taken in the opposite direction to the view in Fig. 11; Fig. 14, a top view of a portion of the knitting-cylinder and of the mechanism by which part of the needles are raised out of action preparatory to knitting the heel or toe of the stocking, and again lowered into action preparatory to knitting a tubular web again; Fig. 15, a top view of a portion of the said mechanism detached; Fig. 16, an inner side view of the parts shown in Fig. 15; Fig. 17, a side view of a portion of the needle cylinder and cam-cylinder, showing, also, the tappet by which the needle-cams are shifted as the motion of the cam-cylinder is reversed, also, the device for holding the knit work properly down on the needles while narrowing and widening the web; Figs. 18, 19, 20, 21, 22, different views of the shifting slide by which the needles are raised one by one out of action and lowered one by one into action in narrowing and widening the web; Fig. 23, an inside view of the shifting slide lifter and depresser; Fig. 24, a top view of the same with the slide; Fig. 25, a cross-section of the lifter; Fig. 26, an inside view of the needle-operating cams; Fig. 27, a top view of the stitch-regulating plate; Fig. 28, a partial side view of the power-shaft and its pulleys, and a cross-section of the driving-shaft, showing, also, one of the pulleys thereon and the belt which runs from the power-shaft to the driving-shaft.

Like letters designate corresponding parts in all of the figures.

In the drawings, A represents the needle-cylinder with needles $a\,a$ therein; B, the revolving cam cylinder or ring around the needle-cylinder for actuating the needles in knitting; C, the power driving-shaft with fast and loose pulleys $b\,c$ thereon; D, the direct driving-shaft having thereon the cog-wheel $d$, which gears into a corresponding cog-wheel, Fig. 2, on the cam cylinder or ring B, as usual. On this shaft also is a crank-wheel, E, or its equivalent, for turning the cam-cylinder by hand at any time, either in the regular operation of the machine or for any special purpose. The power-shaft C and driving-shaft D are shown at right angles to each other, and motion is communicated from the one shaft to the other by means of a belt, F, running round two pulleys, $e\,f$, on the power-shaft and two pulleys, $g\,h$, on the driving-shaft. The pulley $e$ is always fast on its shaft, and the motion is communicated to the driving-belt F thereby. The pulley $f$ is always loose on its shaft, and serves solely to carry the belt and give proper direction thereto in connection with the pulleys on the other shaft, since the belt passes twice around each shaft in order to properly drive the shaft D thereby. The two pulleys $g\,h$ are both loose on the shaft D, but may be coupled thereto respectively by clutch parts G H, Fig. 5, sliding on the shaft and keyed or splined thereon, so as to turn with the shaft. When both pulleys are uncoupled on the shaft, the power-shaft C continues to revolve without operating any part of the machine. When the pulley $g$ is coupled to its shaft, the shaft, and consequently the cam-cylinder, are turned in one direction; and when the pulley $h$ is coupled to its shaft the shaft and cam-cylinder are turned in the other direction. Thus, while the power-shaft continues to revolve constantly in one direction, the driving-shaft D may either not revolve at all, or may revolve in either direction.

In order to control the clutch parts G H for governing the motions of the shaft D, two slides, I J, are employed, each having a backward and forward longitudinal movement in the supporting-frame, and each having a cam-slot, $i$, in which one end of a pivoted connecting-lever, K, Figs. 5 and 6, plays, the other end of each lever playing in a peripheral groove, $j$, in one of the clutch parts G H. There is a longitudinal portion at one end of each slot $i$, which holds its lever K in proper position to keep the connected clutch part coupled, and the other end of each slot is oblique and of sufficient extent to uncouple the clutch part when the connecting-lever K is in its extreme end.

The machine is so constructed that for the regular running to knit the circular web of the leg or foot of a stocking the clutch part G is coupled to the pulley $g$, and the clutch part H is uncoupled from the pulley $h$, as shown in Fig. 5.

Now, the first movement to be effected for knitting the heel or toe of the stocking is to automatically stop the operation of the machine, while the power-shaft C continues to revolve. To do this the slide I has to be slid back, so as to bring the end of its clutch-lever K into the oblique end of its slot $i$, as shown in Fig. 6. This we effect by means of a lever, L, which turns on a pivot, k, the outer end of which bears against an upward-projecting pin, l, on the said slide I, and the inner end of which reaches to within a short distance of the outer periphery of the cam-cylinder B, which is the instrumentality whereby the lever is vibrated, and consequently the slide is moved and the machine stopped. A tappet, m, attached to the revolving cam-cylinder, strikes this lever at the proper time for the purpose; but since this tappet must be out of the way of the lever during the ordinary revolutions of the cam-cylinder, it is necessary that either it shall be moved into a position to strike the lever or the inner end of the lever moved into a position to be struck by the tappet when the time arrives for stopping the machine. We find it most convenient to employ the latter means. The tappet ordinarily passes over the lever, and in order to bring the inner end of the lever up into the pathway of the tappet it is pivoted by its vertical pivot k to a plate or block, n, which itself is pivoted or hinged at o to the frame of the machine, so that its inner edge may be swung up and down as desired. Thus by swinging up the said plate or block the inner end of the lever pivoted thereto is raised with it. It is by this means that the lever is brought into the pathway of the tappet. To do this automatically at the proper time requires, of course, a pattern mechanism, any kind of which may be used for the purpose. We show for this purpose a pattern-chain, M, mounted upon a sprocket-wheel, p, on a horizontal shaft, q, beneath the driving-shaft D. On the sprocket-shaft is a ratchet-wheel, r, into the notches of which engages a pawl, s, Fig. 10, moved by a tracker-pin, t, which is pushed downward by a cam, u, Figs. 1 and 2, on the cam-cylinder B, so that the ratchet-wheel is turned one notch at every revolution of the cam-cylinder. The pawl is retracted by a spring, v.

The pattern-chain M has a cam projection, w, Figs. 4 and 8, on its side, for effecting the stop movement at the proper place where the heel is to be knit and another at the proper place where the toe is to be knit. When either of these cam projections is brought round into position, it strikes the lower end of a lever, x, Figs. 4 and 8, pivoted at y, and having its upper end inclined so as to act as a cam under the movable end of a spring or gravitating plate, z, secured at its other end to cross-bar p', fastened to the top of the slide I, as shown in Fig. 6½. On this plate rests an arm, a', pivoted at its outer end to the slide I, while its inner end reaches toward the cam-cylinder B and under a pin, b', projecting laterally from one side of the plate or block n. The construction of these parts is such that when the cam projection w strikes and moves aside the lower end of the lever x the upper end of the lever raises the inner end of the spring-plate z, thereby lifting the inner end of the arm a', and by the pin b' raising the plate or block n, which in turn raises the inner end of the lever L. Thus the said lever is raised into the pathway of the tappet m, which, moving against the lever, swings it forward till the other end has moved the slide I far enough back to uncouple the pulley g from the driving-shaft D, when the machine stops and the cam-cylinder moves no farther. Next, the needles which are not to be worked while knitting the heel are to be thrown out of action. This we effect by a hand movement, with means by which they are all moved at once. We raise the needles, with the stitches thereon, as shown by dotted lines in Fig. 10, far enough to slide the stitches thereon below their latches. Various constructions of mechanism would accomplish this. We employ a lifter, N, Figs. 14, 15, and 16, which also serves to draw down the needles into action again at the proper time, and we give this lifter, first, a movement inward toward the needle-cylinder to place it in position to engage the butts of the required number of needles; second, an upward movement to raise the needles and hold them raised thereby. Then, when the needles are to be brought down into action it is given a downward movement, and is finally moved away from the needle-cylinder, and is then held away so as not to interfere with the regular movements of the needles in knitting. This lifter is of curved form, as shown in Fig. 14, so as to fit around the periphery of the needle cylinder, and it has two parallel horizontal plates, c' d', the former above and the latter below the butts e' e' of the needles. We prefer to employ long needles a a, Figs. 10 and 19, with these butts e' e' additional to the usual butts, f' f', by which the regular movements of the needles are produced in knitting, so that the lifting mechanism may be well below the cam-cylinder and other operative parts of the machine. To effect the above-specified movements of the lifter, it is mounted on the upper surface or table of a double slide, O, which has an up-and-down movement in stationary guides or ways g' g' at its two side edges or extremities, which are connected by a downward-curved yoke, h', Fig. 10. The lifter is free to move in and out on this slide, and to effect the inward and outward movement of the lifter its ends are respectively pivoted or coupled at i' i' to the inwardly-turned ends of bent levers P P, which are pivoted at j' j' to the respective sides of the yoke h'. The two levers are connected near their lower ends by a bar, k', so that they may be operated simultaneously and together, and may be held in position by one and the same means. The slide O is moved up and down by a cam-lever, Q, pivoted at l' to a stationary part of the machine, and having a slot, m', of the proper form, in which plays a pin, n', of the slide-yoke, so that a downward movement of the free end of the lever will raise the slide and with it the needle-lifter, thus raising the needles, and an upward movement of the free end of the lever will lower the slide and with it the needle-lifter, thus acting to draw down the needles; but the lever Q here performs another function besides raising and lowering the lifter-slide. It also acts upon one of the levers P P, so as to permit the upper ends of both levers to swing inward and carry the needle-lifter inward under the needle-butts, and to cause them to swing outward again to carry the lifter back away from the needle-butts; and since the levers are to be swung inward before the slide is raised the cam-slot $m'$ has or may have a curved portion, $l$, which does not lift the slide any in the first part of the downward movement of the cam-lever until the levers P P are swung inward to carry the lifter into position for lifting. This swinging inward is provided for by simply curving forward or away from the lever Q the lower end of the lever P, which is operated on by the cam-lever Q. As the latter is lowered, the lower end of the former is thereby allowed to be swung back by a spring, $o'$, bearing against it, or, as shown, the connecting-bar $k'$, between the two levers P P, which are thus swung together, carrying the lifter inward to its position for lifting the needles. The cam-lever Q, being then still further depressed, raises the slide and needle-lifter thereon. The parts are to be kept in this position until the heel or toe is knit, the spring $o'$ and curved end of the slot $m'$ engaging with the pin $n'$, holding them immovable.

The mechanism next to be brought into action in the order of knitting is the device for changing the movement into a partially-revolving reciprocating movement preparatory to knitting the heel or toe of the stocking. To effect this the two clutch parts G H are to be made to alternately couple the pulleys $g$ $h$ to the driving shaft D, so as to turn the cam-cylinder first in one direction and then in the other a partial revolution, and thus to knit the web forward and backward, it being evident that this alternate coupling and loosing of the pulleys $g$ $h$ will reverse the movement of the driving-shaft D, while the power-shaft C continually revolves in one direction, since the driving-belt F runs in opposite directions over the said pulleys. The simultaneous shifting of the clutch parts G H to produce this alternate or reciprocating movement of the driving-shaft and the cam cylinder is effected by the two slides I J, already described. For this purpose the two slides are coupled together, so that they shall slide forward and back together, their cam-slots being arranged, as shown, with their oblique portions at opposite ends, so that the coupling end of one is opposite to the uncoupling end of the other. It is to be observed that since sometimes both pulleys are to be unclutched, and therefore one slide is sometimes at one end of its slide movement at the same time when the other slide is at the other end of its movement, the two slides sometimes are to be coupled together and sometimes not.

The means represented for coupling and uncoupling the slides consists of a cross-bar, $p'$, attached permanently to the slide I, and reaching across over the slide J, to which it is coupled by a pin, $q'$, projecting down from the spring-plate $z$, before described, through a hole, $r'$, in the coupling-bar into a hole or notch, $s'$, in the said slide J, as shown most clearly in Figs. 5 and 6½. When the two slides are to be uncoupled, the spring-plate $z$ is raised far enough to lift its pin $q'$ above the slide J, when the pin can ride upon the slide J as the other slide, I, moves or as the slide J moves under it. The spring-plate $z$ is lifted by the cam-lever $x$, actuated by the cam projection $w$ on the pattern-chain M, as hereinbefore described, the uncoupling of the two slides being one of the purposes of lifting the spring-plate preparatory to moving one slide, I, by the lever L, to stop the machine, as before set forth. Then, when the machine is to be started to knit the heel or toe, the slide J is to be moved back by hand till the pin $q'$ is caused by the spring-plate $z$ to drop into the hole in the slide, when the two slides will move together by pushing on either slide.

We have already described the lever L for moving the slide I. A similar lever, R, is employed to move the slide J in the direction opposite to that in which the said lever L moves the slide I. This lever R, bearing also against a stud on the slide J, is similarly mounted on and pivoted to the plate or block $n$, and reaches inward nearly to the outer periphery of the cam-cylinder B. With these two levers, L R, acting in opposite directions, the two slides I J, when coupled together, are moved together, first in one direction and then the other, thereby causing the clutch parts G H to alternately couple the pulleys $g$ $h$ to the driving-shaft, and to repeatedly reverse the motions of the cam-cylinder, as required, for knitting the heel and toe web. The levers L R are thus alternately and automatically acted on to shift the slides by a double-ended tappet, S, Figs. 1 and 17, attached to the outer periphery of the cam-cylinder in the proper position, so that when one end thereof is brought round to the lever L it moves that lever until the slide I is thereby made to uncouple the pulley $g$ on the driving-shaft, and at the same time the slide J is made to couple the pulley $h$ to the driving-shaft, and thereby to reverse the motion of the cam-cylinder, which then is carried round until the other end of the tappet S reaches the lever R and moves it far enough to cause the slide J to uncouple the pulley $h$ on the driving-shaft, and the slide I to again couple the pulley $g$ to the driving-shaft, thus again reversing the motion of the driving-shaft and cam-cylinder. These movements are continually repeated until the heel or toe is completed.

It is necessary that the endwise movement of the clutch parts should be capable of taking place in any position of the clutch parts and pulleys in relation to each other. To insure this we employ sliding coupling-pins $t'$ $t'$, respectively, in the pulleys $g$ $h$, held projected inward by light springs $u'$ $u'$, so that when the coupling-pins $v'$ $v'$ on the clutch parts G H happen to strike against the ends of the said sliding coupling-pins in coupling the latter pins will yield and allow the clutch parts to be brought into place, when a slight forward movement of the clutch parts will carry their pins past the spring coupling-pins, and the springs will instantly throw them again into position ready to engage with the clutch-pins.

In Fig. 5 we show the coupling-pin in the pulley $g$ pushed back by the coupling-pin on the clutch part G bearing against its inner end, and the coupling-pin in the pulley $h$ opposite to the coupling-pin on the clutch part H, but not pushed back thereby, because the pulley is uncoupled. It will of course be understood that it is only now and then that the coupling-pins come opposite to each other in coupling; but such cases have to be provided for, as well as if the occasions were more frequent. The inner ends of the levers L R are of course not to be in the pathway of the tappet S when the machine is knitting a circular web and they are to be brought into the pathway of the tappet preparatory to knitting the heel and toe webs. Ordinarily the levers are just above the pathway of the tappet—that is, when knitting the circular web.

When the machine is automatically stopped, preparatory to knitting the heel and toe webs, it is done by raising the lever L into the pathway of another tappet, $m$, as before specified. This is above the pathway of the tappet S. The act of stopping the machine by the said tappet $m$ (which moves the inner end of the lever L forward and the outer end thereof backward, and with it the slide I, as shown by arrows in Fig. 6, and with the slide I also moves the arm $a'$ laterally backward) carries the aforesaid arm $a'$ out from under the pin $b'$ on the plate or block $n$, or at least from under the horizontal part thereof, as shown in Fig. 3, and consequently the said plate or block falls slightly, and with it the inner end of the lever L falls below the pathway of the tappet $m$, but still in a position above the tappet S. The inclined part of the pin $b'$ serves as a cam, against which the arm $a'$ acts to lift the plate or block $n$ to its highest position when the slide I is again moved forward. Before starting the machine for knitting the heel or toe, therefore, another movement is to be made to lower the inner end of the levers L R into the pathway of the tappet S. The cam-cylinder, also, is then to be partially turned around, to bring the tappet S into proper position in relation to the lever L for commencing the narrowing movement on the heel or toe web. This is effected by turning the driving-shaft D by hand, and in doing this the cam projection $w$ on the pattern-chain M is moved past the lever $x$, and another cam projection, $w'$, Fig. 7, on the said pattern-chain strikes and moves the end of an arm, $x'$, of a lever, W', pivoted at $y'$ on a horizontal support or table, $z'$, of the machine-frame, and moves the adjacent arm $a''$ of another lever, X', out from under a vertically-sliding rod, $b''$, Fig. 4, the lower end of which previously had rested on the said lever X'; but after this movement of the supporting-lever, the said rod rests on the table $z'$, a little lower than before. This lowering of the sliding rod also lowers an arm, $c''$, Figs. 2 and 3, projecting from its upper end and extending to a position under the hinged plate or block $n$, under which its turned-up end bears, and supports the same. This lowering of the sliding rod $b''$, and with it the said hinged plate or block and the levers L R resting thereon, thereby brings the said levers into the pathway of the tappet S. The lifting of the sliding rod $b''$ and of its arm $c''$ to again bring the lever L up out of the path of the tappet S is effected by again swinging the arm $a''$ of the lever X' under the said rod, as hereinafter described.

Before starting the machine for narrowing the heel or toe web another hand movement is made besides raising the needles, which are not to be used in narrowing, out of action. This is to bring two tracker-pins, T T, Figs. 1 and 2, into position for action on opposite sides of the machine by the alternate depression of which, by means of a cam, U, mounted on a standard or projection, $d''$, on the cam-cylinder B the narrowing-needles are raised. These tracker-pins are moved or inclined outward away from the reach of the cam when the machine is knitting a circular web, as shown by full lines in Fig. 1; and when they are to be brought into action for moving the narrowing-needles, cams $e''$ $e''$, or their equivalents, are caused to throw the tracker-pins inward under the cam U when the said cams are moved into the position shown by dotted lines in the same figure. These two cams may be operated together by connecting them in any suitable way, that shown in the drawings being a curved band, $f''$, fitting around the outer periphery of the round supporting table or plate $g''$ of the machine-stand. This band is moved by a handle, $h''$, a little distance around the said curved surface forward or backward to move the cams and throw the tracker-pins into or out of action. This movement for bringing the tracker-pins T T into action may be made immediately after raising out of action the needles not to be used in narrowing and widening, as hereinbefore set forth.

To start the machine again for knitting the heel or toe web, the slide J is moved backward until the coupling-pin $q'$ is sprung into the hole or notch $s'$ in the said slide, thereby coupling the two slides together and coupling the pulley $h$ to the driving-shaft D, the cam-cylinder B then being in position to begin to turn or reciprocate in the right direction.

The narrowing of the heel or toe web, which is the first operation of the machine after starting it, as last above set forth, is effected by raising out of action, first, a terminal operating-needle on one side and then one on the other side of the needle-cylinder each time that the cam-cylinder is reciprocated. This is effected by mechanism actuated by the tracker-pins T T, above specified, the said pins operating on levers V V, Figs. 2 and 23, which are pivoted at $i''$ $i''$ to parts of the machine-frame, and to the outer ends of which the said tracker-pins are respectively pivoted. The tracker-pins are raised again each time by levers W W, pivoted at $j''$ $j''$, which at one end lift under pins or projections $k''$ $k''$, Figs. 23, 24, on the sides of the respective tracker-pins, while at the other end they are turned up, so as to reach and be acted upon by another cam, X, also mounted on a projection of the cam-cylinder B, the pathway of this cam being outside of or different from the pathway of the other cam, U. This cam X, through the levers W W, raises the tracker-pins T T into position again ready to be acted on by their own cam U. The cams U X are double-ended, and act upon one tracker-pin T and one lever W when they reciprocate in one direction, and upon the other tracker-pin and the other lever when they reciprocate in the other direction. The two cams are so situated in relation to each other and to the positions of the tracker-pin and reversing-lever on each side of the machine as to depress the respective tracker-pins and raise them again at the proper times. Thus, when the cams are reciprocated in either direction, the cam U, near the close of its reciprocating movement, passes over a tracker-pin T, which at the time is depressed, (this having been effected at the beginning of the preceding movement in the other direction,) and therefore has no effect thereon. When, after the cam U has passed over the said tracker-pin, the cam X, just at the close of the movement, acts upon the lever W on that side of the machine and raises the tracker-pin, then, when the cams commence their movement in the opposite direction, the cam U in passing over the tracker-pin depresses it. This movement is repeated on the other side of the machine.

The needle-raising mechanism for narrowing is now to be described. A single needle-lifter, Y, is arranged on each side of the needle-cylinder for the purpose, and as these lifters act one at a time on a considerable number of needles, they are required to move around the periphery of the needle-cylinder step by step, and the two always in opposite directions, since in narrowing they approach each other and in widening they recede from each other. For the purpose of imparting this step-by-step movement to the lifters, first in one direction around the needle-cylinder and then in the other direction, they are respectively mounted on two circular racks, A' B', surrounding and turning partially around the needle-cylinder, one some distance above the other, and both gearing with an intermediate cog-wheel, Z, which turns on a pivot, $l''$, projecting from the needle-cylinder, or otherwise suitably mounted. When this cog-wheel is turned in either direction, it causes the two racks to turn in opposite directions. This cog-wheel is turned in either direction by means of two ratchet-wheels, C' D', which might be mounted on a common shaft with the cog-wheel, but which, for the purpose of obtaining any proportional rate of movement desired, may just as well be mounted on a separate shaft, $m''$, as shown in the drawings, the said shaft being geared to the cog-wheel Z by connecting-gears $n''$ $o''$. The ratchet-wheels C' D' are cut to be moved in opposite directions, and the teeth of one come midway between the teeth of the other, as shown in Fig. 13. They are moved, respectively, by two pawls, E' F', located on opposite sides thereof, as shown in the same figure, and, being thus situated, they may be drawn inward so as to take into the notches of their respective ratchet-wheels by a single connecting-spring, $p''$. They may also be moved simultaneously up and down for actuating the ratchet-wheels, and, for this purpose, they are pivoted, respectively, to arms of a vertically-sliding bar, $q''$, which is depressed, to force the pawls downward, by a tracker-pin, G', projecting upward through the table of the machine-frame into the pathway of a cam carried around by the cam-cylinder B. The same cam U which depresses the tracker-pins T T may be used, and we have so shown it in the drawings, and also this tracker-pin may be moved out of the pathway of this cam at any time by removing a key, $r''$, Fig. 2, and allowing it to swing outward a little. The pawls are retracted by a lifting-spring, $s''$. It is obvious that these two pawls should not both act at the same time on their respective ratchet-wheels, and we employ means to prevent this, which means are the instrumentality by which we control the movements of the pawls and time their actions. Two slide-plates, H' I', Figs. 12 and 13, are arranged to slide inward inside of the said pawls, respectively, to hold the pawls out of action, and these slide-plates are connected together by a swinging lever, J', pivoted to the frame at $t''$, and to the two slide-plates. The construction and arrangement of the slide-plates and lever in relation to the pawls are such that when the lever is swung in, as shown by full lines in Fig. 12, the slide-plate H' is moved inward, so as to hold the pawl E' out of action, and the slide-plate I' is moved outward far enough to allow the pawl F' to act on its ratchet-wheel, and when the lever is fully reversed the pawl E' is brought into action and the pawl F' is held out of action. When the lever is moved to a half-way position between its extreme movements, as indicated by dotted lines in Fig. 12, both pawls are held out of action, and the last is the position in which the slide-plates are placed when the machine is knitting a circular web. The three positions of these slide-plates are controlled by a pattern chain or wheel, K', which, since its movements are required always to time with the movements of the other pattern-chain, M, is mounted on a sprocket-wheel, $u''$, on the same shaft $q$, and hence is operated by the same means as the other pattern-chain. Indeed, one pattern chain or wheel might be constructed to serve the purposes of both pattern-chains herein shown and described.

In order to connect the action of the pattern-chain K' with the slide-plates H' I', two cam-slides, L' M', Figs. 7 and 9, are located so as to be respectively moved outward by cam projections $v''$ $w''$, respectively, on the opposite edges of the pattern-chain. These cam-slides act upon a pin or projection, $x''$, on a sliding rod, N', which reaches thence across the back side of the machine, and is connected at the other end with the lower or outer end of a lever, O', pivoted to the frame at $y''$ and at $z''$ to one of the slide-plates H' I' or their connecting-lever J', as shown in Figs. 4, 11, and 12. When the cam-slide L' is moved out by a cam projection, $v''$, on the pattern chain K', as shown in Fig. 7, the slide plates H' I' and connecting-levers J' are in the position shown by full lines in Fig. 12, and when the cam-slide M' is moved out by a cam projection, $w''$, on the pattern-wheel K', the positions of the slide-plates H I are reversed. When both cam-slides are thrown half-way out by the action of cam projections of half-height on the pattern-chain, as shown in Fig. 9, then both slide-plates H' I' are moved in half-way, as shown by dotted lines in Fig. 12, and such half-rise cam projections are placed on the said pattern-chains in the proper positions to throw both of the pawls E' F' out of action whenever the movement of the machine is changed to knit a circular web. Thus all the movements of the machine are timed to act harmoniously, and to automatically succeed one another or act together, as the case may be.

For narrowing, the pawl E' is brought into action, so as to move the two needle lifters Y Y, attached to the respective racks A' B', toward each other. The movement of each ratchet-wheel one notch by its pawl moves the needle-lifters Y Y each half the distance from one needle to the next in order, so that as the cam-cylinder B moves in one direction and actuates a pawl, as E', a needle is lifted by a lifter Y and in the next reverse movement of the cam-cylinder actuating the same pawl again the needle-lifter is carried down, being then half-way between the needle just lifted and the next in order, so that it interferes with neither needle in its descent. This movement is illustrated in Fig. 21, which shows the inner side of the needle-lifter, and three needles in relative position thereto. The dotted lines indicate the half-way position of the lifter as it descends, and the two lifters are arranged so as to alternate with each other in raising the needles out of action, one raising a needle and the other descending between needles at each movement of the cam-cylinder. Each lifter Y is constructed with a slide, $a'''$, having a projection, $b'''$, to take under the lower butt, $e'$, of each needle, for lifting the same, and a projection, $c'''$, above the projection $b'''$ for drawing down on the butt $e'$ of each previously-raised needle, this lifter being also a depresser for drawing down the needles in the subsequent act of widening the web. The lifting-slide $a'''$ has a vertical movement in a slot or guide, $d'''$, of the lifter-frame, through which slot a coupling-pin, $e'''$, projects forward to couple the lifting slide with a lifter slide mover, P', Figs. 2, 23, 24, 25. The pin is coupled thereto simply by reaching between two horizontal parallel plates, $f''''$ $g'''$, between which it is free to move laterally, and the plates are long enough to allow any required extent of travel to be given to the lifters in narrowing and widening. The said plates are attached to a slide-block, $h'''$, moving up and down in stationary guides or ways $i'''$ $i'''$. The requisite up and down movement of the slide-blocks and their parallel plates is communicated thereto by the tracker-pins T T, the movements of which have been described, the inner end of a lever, V, being pivoted to each slide-block $h'''$. We consider it undesirable to give much extent of movement to the lifter-slides $a'''$ $a'''$, and we provide for completing the lifting movement of the narrowing needles by the action of the drawing-down cams Q' Q' on the inside of the cam-cylinder B, acting on the regular butts $f'$ $f'$ of the needles, as shown in Fig. 26. The arrow shows the direction in which the cam-cylinder is moving to effect the movement as depicted in the figure. The first or left-hand needle shown is represented as being partly raised by the lifting-slide $a'''$, as above described, and the second or right-hand needle is represented as completely raised by the left-hand drawing-down cam, which is lifted into the position shown for the purpose, while the other drawing down cam is shown in its ordinary position for drawing down the needles in knitting. The means by which these cams are brought into position alternately for completing the raising of the needles one by one, for narrowing first on one side and then on the other, is shown in Fig. 17. The instrumentality for the purpose is the tappet S, employed for moving the levers L R to reverse the motion of the machine in narrowing and widening. The tappet performs this additional function by having itself a horizontal sliding movement resting, by means of supports $d''''$ $d''''$, Fig. 17, upon the ledge $e''''$ of the cam-ring, being bolted to the said supports, as shown, and sliding therewith on the said ledge to the requisite extent, effected by the resistance of the levers L R as it strikes first one lever at one end and then the other lever at the other end, so that the cams Q' Q' are alternately raised and lowered at every reverse reciprocating movement of the cam-cylinder. The sliding movement of the tappet operates on the cams Q' Q' by means of oblique slots $j'''$ $j'''$ in the tappet-plate, which fits the outer periphery of the cam-cylinder, in which slots studs or pins $k'''\,k'''$, projecting outward from the cams, play. The oblique slots are of the proper form and arrangement to effect the purpose, as clearly seen in the said Fig. 17. There are of course the requisite slots $l'''\,l'''$, Fig. 26, through the cam-cylinder to allow these movements of the studs therein to effect the movement of the cams. As soon as the web is sufficiently narrowed by the movements just described, the next movement is to reverse the motions of the circular racks A' B' and of the needle-lifters Y Y thereon for widening the web. This is automatically effected by a cam projection, $w''$, on the pattern-chain K', striking the cam slide M', and by forcing the latter outward, moving the pin $x''$ and sliding rod N', thereby reversing the positions of the slide-plates H' I', and bringing the pawl E' into action, as well as moving the pawl F' out of action. The movements of the operative parts then continue to go on as when narrowing, with the following changes in effect: The lifting-slides $a'''\,a'''$, having their movements reversed, then ascend between the needles and descend in front of the needles, whereby the drawing-down projections $c'''\,c'''$ act on the tops of the butts $e'\,e'$ of the needles to draw down the needles part way, leaving the needles to be brought down the remainder of the way by the drawing-down cams Q' Q', which continue to be raised and lowered by the tappet S, and now pass over the butts of the needles, instead of passing under them, as when narrowing.

In order to disengage the upper projections, $c'''$, of the slides $a'''$ from the butts of the needles engaged thereby, when the said needles have been depressed by the slides to proper position for engagement by the drawing-down cams Q', the upper projection $c'''$ of each slide $a'''$ is pivoted at $m'''$ to the main part of the slide and at $n'''$ to the frame. The lower or main part of the slide is also pivoted at $o'''$ to the frame. The arrangement is such that by moving the lower end of the main slide a little inward the projection $c'''$ will be thrown back out of the way of the needles, as shown by dotted lines in Fig. 22. To throw the lower end of the slide inward, it has a slight inclination, $p'''$, on its lower outward angle or heel, which strikes a projection, $q'''$, on the slide-frame just as the slide reaches the termination of its downward movement. The lower end of the slide is again thrown backward, and the projection $c'''$ again thrown into position for action by a little forward projection, $r'''$, on the inner lower corner of the the slide striking another fixed projection or pin, $s'''$, on the slide-frame as the slide begins to be raised again.

As soon as the widening of the web is completed, the next movement is to automatically stop the machine preparatory to adjusting it for again knitting a tubular web. This is effected by another cam projection, $w$, on the pattern-chain M striking the lever $x$, and thus raising the spring-plate $z$, so as to lift the coupling-pin $q'$ out of the hole or notch $s'$ in the slide J to uncouple the two slides, so that when the tappet $m$ next strikes the lever R the slide J is moved forward without moving the slide I backward, thereby uncoupling the pulley $h$ on the driving-shaft, the pulley $g$ being already uncoupled by the position of the slide I before the two slides are thus uncoupled. Another cam projection, $t'''$, Fig. 7, on the pattern-chain M at the next turn of the cam-cylinder strikes a projection of the lever X', causing the inclined edge $u'''$ thereof to move under the sliding rod $b''$, thereby, through its arm $c$, raising the levers L R above the tappet S, but below the tappet $m$; also, at this time half-rise projections $v''\,w''$ on the pattern chain K' move the cam-slides L' M' half-way out, as shown in Fig. 9, thereby moving the slide-plates H I into the middle position and holding both pawls E' F' out of action. Next, the needles which were raised out of action for narrowing and widening are brought down into action by raising the free end of the cam-lever Q, reversing the movements of the mechanism, as described, for lifting the needles; also, the tracker-pins T T are moved out of the pathway of the cam U by sliding the cam-connecting band $f''$ back. The machine is then started for knitting a circular web by drawing forward the slide I, thus coupling the pulley $g$ to the driving-shaft D and leaving the other pulley, $h$, loose upon the shaft.

In order to form a well proportioned or fashioned stocking, the narrowing and widening movements should be carried to the extent of a greater number of needles in knitting the heels than in knitting the toes; but by the ordinary methods of knitting, and so far as has been heretofore described in this specification, the narrowing and widening are carried to the same extent in knitting both the heel and the toe. We have devised means whereby any less number of needles are raised out of action and again brought into action in narrowing and widening the toe than in knitting the heel, and the movements necessary to this effect are made automatic additions to the movements already described. By the mechanism already specified we raise out of action only as many needles—say forty—as will leave all the needles—say fifteen on each side—which we desire to raise out of action one by one in narrowing for the heel of the stocking. Now, in order to narrow for the toe of the stocking, if we wish to raise out of action one by one only ten needles on each side, we provide for raising out of action at the beginning five more needles on each side, or ten needles in all, more than we do for narrowing the heel, so that we must raise, say, fifty needles together at the last. To do this we employ upper and lower extension-plates, $w'''\,w'''$, Figs. 15 and 16, arranged to slide between the lifter-plates $c'\,d'$, as shown by full lines in the figures, when the heel is to be knit, or slid out endwise beyond the ends of the plates $c'\,d'$, as shown by dotted lines in the same figures, when the toe is to be knit. Each pair of upper and lower extension-plates are to be connected by studs or other means so as to be moved together. Pins $x'''$ $x'''$ are attached to the respective pairs of extension-plates and extended outward to be coupled with the inwardly-turned ends of bent levers R' R', which are pivoted at $j'$ $j'$ to the levers P P, by which the lifter N is actuated. Thus the said lifter is operated in the regular way without extending the extension-plates, since the levers R' R' move with the levers P P; but for the purpose of throwing out the extension-plates when the toe is to be knit, the lower ends of the levers R' R' are moved toward the levers P P, when manipulating the latter, thereby moving forward the upper ends thereof, and consequently extending the extension-plates under the additional needles—say five on each side—to be lifted out of action. The two levers R' R' are connected together at their lower ends by a rod or bar, $z'''$. The extension-plates are drawn back, after the narrowing and widening, by moving the lower ends of the levers R' R' away from the levers P P, when the latter levers are manipulated to draw down the needles. Then, since in this extension of the lifter N the narrowing is commenced farther along, with fewer operating-needles, the single-needle lifters Y Y are required to be moved forward before the knitting of the toe is begun, so as to begin on the proper needles for narrowing. This is automatically effected by starting the operation of the ratchet-pawl E' by a proper cam projection on the pattern-wheel K', in the manner hereinbefore described, some time during the knitting of the foot-web, and continuing the action of the pawl till it brings the lifters Y Y to the required positions, it requiring, for the example mentioned in this specification, the movement by the pawl of ten notches of its ratchet-wheel to move the lifters each along to the extent of five needles. The further movement of the pawl E' is then stopped by a proper cam projection on the pattern-chain to bring the slides H' I' into a middle position when both pawls are out of action. Then, after the toe is formed and while knitting the next leg-web, the lifters Y Y are to be moved back to the same extent by means of another proper cam projection on the pattern-wheel K', for reversing the pawls and bringing the pawl F into action. When the proper movement of the lifters has been thus effected again, another proper cam projection on the said pattern-wheel stops the action of the pawl F without bringing the other pawl into action.

For holding the knit web down on the needles without the use of a weight or equivalent device drawing on the web we employ a disk or plate, S', attached to the cam-cylinder shaft, so as to revolve just over the last stitches of the web, the edge of the disk or plate reaching nearly out to the needles for the purpose. The disk or plate is adjustable up or down on the shaft by means of a set-screw, $S^4$, Fig. 1, passing through the hub of the plate around the shaft and bearing against the said shaft to adapt its position to the fineness or coarseness of the yarn and to the degree of pressure desired on the web. The outer edge of the disk or plate is cut away at one side for some distance each side of the thread-guide T', to allow sufficient room for the raising of the needles in knitting. The two shoulder edges $a''''$ $a''''$ of the disk or plate at the ends of the cut-away are turned up a little, so as to pass over the stitches without catching against them when the cam-cylinder is moving in either direction.

We find in narrowing and widening the heel or toe web, although we raise and lower the terminal-acting needles gradually, that stitches are apt to be dropped or made imperfect, without some additional means for securing the proper taking of the stitches by the said needles. This may be effected by means of three toothed wheels, U' U' U', arranged obliquely, as shown, and meshing with the needles, by which they are turned as the cam-cylinder B on which they are pivoted is turned around, the teeth of the wheels pressing down the stitches into their proper positions on the needles as they go down between the said needles; but we herein disclaim these wheels, and though we have shown them we have since devised a simpler and still effective device, which consists in the plate or disk S', adapted to the purpose by the construction shown in Fig. 27. The plate is cut away in its periphery at two places, where the needles rise to take new stitches—one on each side of the thread-guide—leaving between the cut-aways a projection, $b''''$, inside of the thread-guide. The shouldered ends of the projection $b''''$ are also turned up a little in the same manner as the other shoulders, $o''''$ $o''''$, at the other ends of the cut-aways. This plate, thus constructed, serves in a very simple way to hold the stitches, as desired, down on the needles. Finally, to hold the latches of the needles which are raised out of action preparatory to narrowing and widening, from being thrown out and interfering with the thread during the knitting of the flat web for the heels and toes of the stockings, we place a band or curved plate, V', in a position to be just outside of the needles thus raised, being suitably supported, so as to turn with the cam-cylinder B, the means of support (shown in Figs. 1 and 2) consisting of arms Y' Y' attached to opposite parts of the curved plate and secured to the bracket arm or bearing Z', in which the upper journal of the cam-cylinder shaft turns. This band also does not reach all around the needle-cylinder. There is a space between its ends $c''''$ $c''''$ on both sides of the thread-guide, to leave free room for the knitting operation.

We claim as our invention—

1. The combination of the revolving cam-cylinder B, having a tappet, $m$, thereon, a stop-lever, L, slide I, lever K, clutch part G, pulley $g$, driving-shaft D, gearing for driving the cam-cylinder from the shaft D, belt F, and power-shaft C, whereby the machine is stopped by the action of the cam-cylinder, for the purpose herein set forth.

2. The combination of the revolving cam-cylinder B, having a tappet, m, thereon, stop-lever L, slide I, lever K, clutch part G, pulley g, driving shaft D, gearing for driving the cam-cylinder from the shaft D, belt F, power-shaft C, pattern-chain M, mechanism for actuating the pattern-chain, and mechanism, substantially as described, connecting the pattern chain and lever, whereby the said lever is moved into the pathway of the cam-cylinder tappet, for automatically stopping the machine, substantially as described.

3. The combination of the stop-lever L, pivoted block n on which the stop-lever rests and is raised and lowered, pattern-chain M, mechanism for actuating the pattern-chain, lever x, actuated by the pattern-chain, plate z, lifted by the said lever x and arm a', between the plate z and block n, the whole constituting mechanism for raising the stop-lever by the pattern-chain, substantially as herein specified.

4. The combination of the power-shaft C, driving-shaft D, connecting-belt F, pulleys e f on the shaft C, pulleys g h on the driving-shaft driven in opposite directions by the belt-clutch parts G H, for the respective pulleys, slides I J, and levers K K, for operating the respective clutches, levers L R, for moving the respective slides revolving cam-cylinder B, gearing for revolving the cam-cylinder from the shaft D, and double-ended tappet S on the cam-cylinder, adapted to act alternately on the levers in opposite movements, whereby the motion of the cam-cylinder is automatically reversed at every turn thereof, substantially as described.

5. The combination of the clutch-operating slides I J, having slots i i, reversed in position, coupling cross-bar p', attached to one of the slides, and spring-plate z on the cross-bar carrying a coupling-pin, q', adapted to drop or be forced into a coupling hole or notch, s', in the other slide, whereby the slides may be coupled together for moving simultaneously, substantially as described.

6. The combination of the needle-cylinder, needles a a, needle-lifter N, and mechanism consisting of the slide O, levers P P, and cam-lever Q, whereby the needle-lifter is first moved to place it in position to engage the butts of the needles, then upward to raise the needles, then downward to draw down the needles, and then outward away from the needles, for the purpose herein specified.

7. The combination, with the needle-lifter N, of the extension-plates $w''' \ w'''$ and means, consisting of the levers R' R', for extending and retracting the same, for the purpose herein specified.

8. The combination, with the levers L R, cam-cylinder, means for revolving the same, and tappet S, of mechanism consisting of the lever X', sliding rod $b''$, arm $c''$, lever W', the pattern-chain M, and means for actuating the pattern-chain M, whereby the said levers L R at the proper time are automatically brought into and raised above the pathway of the tappet, for the purpose herein specified.

9. The combination of the tracker-pins T T, cam U, means for supporting the said cam, and means consisting of the cams $e'' \ e''$, and connecting-band $f'$, for moving the tracker-pins into and out of the pathway of the cam, for the purpose herein specified.

10. The combination of the tracker-pins T T, retracting-levers W W, cam X, and means for supporting the cam, for the purpose herein specified.

11. The combination of the lifters Y Y, circular racks A' B', connecting-gear Z, ratchet-wheels C' D', actuating pawls E' F', and means for actuating the said pawls, substantially as and for the purpose herein specified.

12. The combination, with the pawls E' F', means for actuating the said pawls, slide-plates H' I', pattern-chain K', means for actuating the said chain, cam-slides L' M', and mechanism consisting of the connecting-rod N', lever o', and lever J', whereby the movements of the slide-plates are automatically controlled, for the purpose herein specified.

13. The combination of a needle-lifter, N, provided with extensions for lifting a variable number of needles out of action at one time, and means for operating said lifter with single needle-lifters Y Y, and means, substantially as described, for supporting and operating said lifters Y Y, whereby lateral movements may be imparted thereto to adapt them in position to the variable number of needles by the lifter N, for the purpose herein specified.

14. The disk or plate S', provided with the projection $b''''$ and shoulders $c''''$, substantially as herein specified, in combination with the needle-cylinder and needles, for the purpose set forth.

WM. H. PEPPER.
ALBERT T. L. DAVIS.

Witnesses:
J. H. SLEEPER,
THOMAS HAM.